US008351530B2

(12) United States Patent
Pan et al.

(10) Patent No.: US 8,351,530 B2
(45) Date of Patent: Jan. 8, 2013

(54) METHOD AND APPARATUS FOR TRANSMITTING CONTROL SIGNALING FOR MIMO TRANSMISSION

(75) Inventors: Kyle Jung-Lin Pan, Smithtown, NY (US); Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1244 days.

(21) Appl. No.: 12/031,871

(22) Filed: Feb. 15, 2008

(65) Prior Publication Data

US 2008/0212701 A1  Sep. 4, 2008

Related U.S. Application Data

(60) Provisional application No. 60/890,201, filed on Feb. 16, 2007, provisional application No. 60/890,311, filed on Feb. 16, 2007.

(51) Int. Cl.
*H04B 7/02* (2006.01)
(52) U.S. Cl. ....................................... 375/267
(58) Field of Classification Search .................. 375/267, 375/299, 347, 349; 700/53; 455/101, 132–141
See application file for complete search history.

(56) References Cited

U.S. PATENT DOCUMENTS

| 7,649,831 | B2 * | 1/2010 | Van Rensburg et al. | 370/203 |
| 7,778,342 | B2 * | 8/2010 | Larsson et al. | 375/267 |
| 2004/0001429 | A1 | 1/2004 | Ma et al. | |
| 2006/0195576 | A1 | 8/2006 | Rinne et al. | |
| 2008/0080634 | A1 * | 4/2008 | Kotecha et al. | 375/267 |

OTHER PUBLICATIONS

Van Rensburg et al. U.S. Appl. No. 60/924,819, p. 1-25, filed May 2007.*
Van Rensburg et al. U.S. Appl. No. 60/924,761, p. 1-25, filed May 2007.*
Alcatel et al, "Principles for the Evolved UTRA Radio-Access Concept, Revision 1," TSG RAN WG1 Ad Hoc on LTE, R1-050668, Sophia Antipolis, France (Jun. 20-21, 2005).

* cited by examiner

*Primary Examiner* — Khanh C Tran
(74) *Attorney, Agent, or Firm* — Eric Berkowitz; Theodore Naccarella

(57) ABSTRACT

A method and apparatus for processing multiple-input multiple-output (MIMO) transmission are disclosed. A wireless transmit/receive unit (WTRU) receives downlink control information including WTRU-specific MIMO and transport format information and MIMO information for all other WTRUs assigned to the same resource. The WTRU processes received MIMO data based on the downlink control information. The downlink control information may also include transport format information for all other WTRUs assigned to the same RB. The downlink control information may be transmitted via WTRU-specific control signaling. All WTRUs' MIMO and/or transport format information may be transmitted via resource-specific common control signaling. The downlink control signaling format may include at least one of a number of streams for the WTRU, a number of active WTRUs assigned to the same resource, a spatial channel identity for the WTRU, a MIMO mode, a precoding matrix index and a precoding vector index.

40 Claims, 2 Drawing Sheets

METHOD AND APPARATUS FOR TRANSMITTING CONTROL SIGNALING FOR MIMO TRANSMISSION

CROSS REFERENCE TO RELATED APPLICATIONS

This application claims the benefit of U.S. provisional application Nos. 60/890,201 filed Feb. 16, 2007 and 60/890,311 filed Feb. 16, 2007, which are incorporated by reference as if fully set forth.

FIELD OF INVENTION

This application is related to wireless communications.

BACKGROUND

The third generation partnership project (3GPP) and 3GPP2 are currently considering long term evolution (LTE) of the universal mobile telecommunication system (UMTS) terrestrial radio access (UTRA). Currently, single carrier frequency division multiple access (SC-FDMA) and orthogonal frequency division multiple access (OFDMA) are being considered for uplink and downlink air interface for the evolved UTRA (E-UTRA).

In SC-FDMA and OFDMA, a plurality of orthogonal subcarriers are divided into a plurality of subcarrier blocks, (also known as "resource blocks" (RBs)). An RB is a basic scheduling unit for uplink transmissions in an SC-FDMA system. Depending on a data rate or a buffer status, at least one RB or resource block group (RBG) is assigned for a wireless transmit/receive unit (WTRU) for uplink and downlink transmission.

Multiple-input multiple-output (MIMO) refers to the type of wireless transmission and reception scheme where both a transmitter and a receiver employ more than one antenna. A MIMO system takes advantage of the spatial diversity or spatial multiplexing to improve the signal-to-noise ratio (SNR) and increases throughput. Multi-user MIMO (MU-MIMO) is the scheme that more than one user data is allocated to the antennas or spatial streams, while single-user MIMO (SU-MIMO) is the scheme that only one user data is transmitted via multiple antennas or spatial streams.

Downlink scheduling grant control signaling is essential to a MIMO system for both SU-MIMO and MU-MIMO because efficient downlink scheduling grant control signaling may improve MIMO link performance, system capacity and spectrum efficiency.

SUMMARY

A method and apparatus for processing MIMO transmission are disclosed. A WTRU receives downlink control information including WTRU-specific MIMO information and transport format information for the WTRU, and MIMO information common for all WTRUs assigned to the same RB, RBG or sub-band, or the same time/frequency resource(s). The WTRU processes received MIMO data based on the downlink control information. A separate control channel (distinct from WTRU-specific control signaling) is used to communicate control information that is common to a group of WTRUs. For example, if a group of WTRUs share the same resource, (e.g., same RB, RBG, sub-band, etc.), they can be grouped together so that they may receive the control information that is common to the group of WTRUs by accessing the WTRU group common control channel. By using the WTRU group common control channel, (namely RB-specific, RBG-specific, or sub-band-specific common control channel), for a group of WTRUs, common control information only needs to be transmitted once in the air.

The downlink control information may also include transport format information for all other WTRUs assigned to the same resource(s). The downlink control information may be transmitted via individual control signaling.

The downlink control signaling format may include at least one of a number of streams for a WTRU, a number of active WTRUs assigned to the same resource(s) (RB, RBG or sub-band), a spatial channel identity for the WTRU, a MIMO mode, information for precoding and/or beamforming, such as a precoding matrix index and/or a preceding vector index. For efficient signaling RB-specific, RBG-specific or sub-band-specific common control information includes information that may be common for all WTRUs assigned to the same time/frequency resource(s) such as precoding or beamforming matrices, precoding or beamforming vectors, the number of active WTRUs assigned to the same RB, RBG or sub-band. This information can be used for performing joint data detection and interference cancellation. Other information that may be common to WTRUs assigned to the same RB, RBG or subband can also be carried in the RB-specific, RBG-specific or sub-band-specific common control channel.

To perform post decoding successive interference cancellation (SIC), additional information from other WTRUs, (such as transport format, modulation and coding scheme, some HAQR parameters, such as redundancy version from other WTRUs), is needed for a given WTRU. This information for all desired and other WTRUs may be transmitted via RB-specific, RBG-specific or sub-band-specific common control channel to enable performing post decoding SIC or other advanced receivers.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Embodiments disclosed herein are applicable to both SU-MIMO and MU-MIMO. The embodiments disclosed herein may also be applied to a spatial multiplexing (SM), spatial division multiple access (SDMA) system, or the like.

Figure 1:
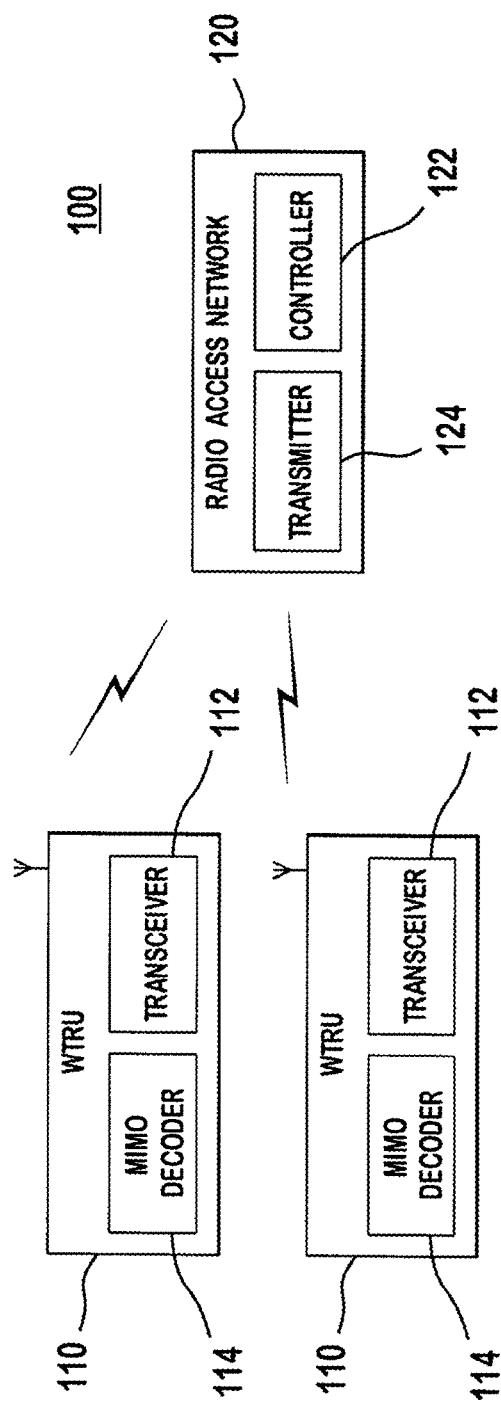
FIG. 1 shows a block diagram of an example wireless communication system including WTRUs and a radio access network (RAN)

FIG. 1 shows a block diagram of an example wireless communication system 100 including WTRUs 110 and an RAN 120. The RAN 120, (e.g., Node-B), sends downlink control signaling to the WTRUs 110 for MIMO transmission and reception. The MIMO may be SU-MIMO or MU-MIMO. The WTRU 110 includes a transceiver 112 and a MIMO decoder 114. The transceiver 112 receives the downlink control signaling and the MIMO decoder 114 processes received MIMO data based on the downlink control signaling. The RAN 120, (e.g., Node-B), may include a controller 122 for generating the downlink control information and a transmitter 124 for transmitting the downlink control information and MIMO data to WTRUs, which will be explained in detail below.

Scheduling grant information (uplink and/or downlink) for WTRUs 110 may be transmitted from the RAN 120 to each of the WTRUs 110 via a WTRU-specific control channel (or signaling). Each WTRU 110 receives the scheduling grant information via the WTRU-specific control channel intended or assigned for each WTRU 110. Downlink scheduling grant information includes, but is not limited to, downlink RB assignment information, a WTRU ID, a transport format, (e.g., payload size, modulation, etc.), hybrid automatic repeat request (HARQ) information, and MIMO information for a particular WTRU. The downlink scheduling grant information may also include MIMO information (such as PVI or PMI for joint receiver processing) and transport format information (optional) for other WTRUs assigned to the same resource, (RB, RBG, sub-band, etc.).

Other WTRUs' MIMO information is used to jointly detect and decode data in MU-MIMO. Other WTRUs' transport format information is used to enable advanced receivers at the WTRU 110, (such as MMSE-successive interference cancellation (SIC) or other type interference cancellation scheme).

Transmitting other WTRUs' MIMO and/or transport format information to each of the WTRUs 110 via a WTRU-specific channel will need significant amount of signaling overhead because the same information is sent to each WTRU, which results in duplicated redundant signaling and increased signaling overhead in the system.

Therefore, common scheduling grant information among WTRUs assigned to the same resource, (RB, RBG, sub-band, etc.), is pulled together and sent via a "common" channel. All WTRUs assigned to the same resource access the common channel and receive the common information. This would be an efficient way to reduce the signaling overhead and increase efficiency of resource utilization.

A resource-specific common control channel, (RB-specific, RBG-specific, sub-band-specific, etc.), is provided to carry the common control information, (i.e., the information that is needed in all WTRUs assigned to the same resource). Instead of transmitting the resource-specific (RB-specific, RBG-specific or sub-band-specific) common control information to each and every WTRU separately, the resource-specific common control information is transmitted once via the resource-specific common control channel.

The resource-specific common control information includes all WTRUs' MIMO information, (e.g., PVI or PMI) and optionally all WTRUs' transport format information, (e.g., modulation, coding rate, etc.). The PVI or PMI may be used for joint receiver processing, such as joint MMSE in MU-MIMO. The WTRUs' transport format information may be used for advanced receiver processing, (such as MMSE-SIC or other type of IC or advanced receiver scheme).

Figure 2:
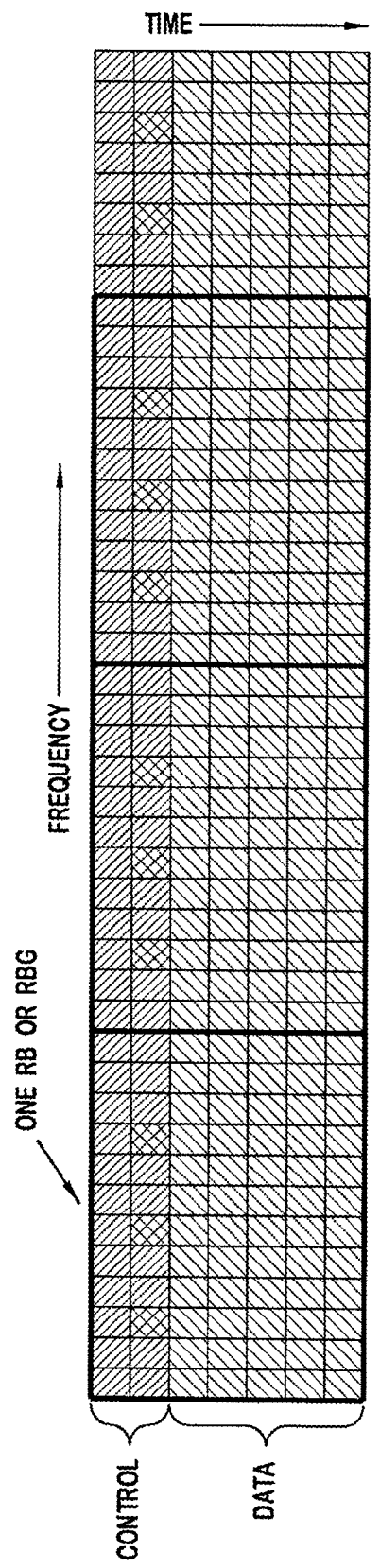
FIG. 2 shows an example resource-specific common control signaling.

FIG. 2 shows an example structure for resource-specific (RB-specific, RBG-specific or sub-band-specific) common control signaling. In FIG. 2, each resource grid comprises one subcarrier in frequency domain in one OFDM symbol time duration. A resource grid is also referred to resource element (RE). An OFDM symbol comprises a plurality of sub-carriers in frequency domain. One RB comprises a plurality of sub-carriers and OFDM symbols. For example, one RB may comprise 12 sub-carriers and 7 OFDM symbols. An RBG or sub-band may comprise one or several RBs. FIG. 2 shows that the first two OFDM symbols are used for control channel and five OFDM symbols are used for data channel in time domain. At least one of RB, RBG or sub-band is assigned to a WTRU 110. The RB-specific, RBG-specific or sub-band-specific common control information is transmitted via a predetermined resource(s) in each RB, RBG or sub-band of resources as shown in FIG. 2. In the first two OFDM symbols certain number of REs is used for RB-specific, RBG-specific or sub-band-specific common control channel and the remaining REs in the first two OFDM symbols are used for WTRU-specific control channel.

The RB-specific, RBG-specific or sub-band-specific common control signaling is implemented with frequency division multiplexing (FDM) as the example shown in FIG. 2. However, it should be noted that the RB-specific, RBG-specific or sub-band-specific common control signaling may be implemented with time division multiplexing (TDM) or code division multiplexing (CDM), any combination of FDM, TDM or CDM, or any other type of multiplexing scheme. Any kind of layout or pattern for an RB-specific, RBG-specific or sub-band-specific common control channel is applicable.

Figure 3:
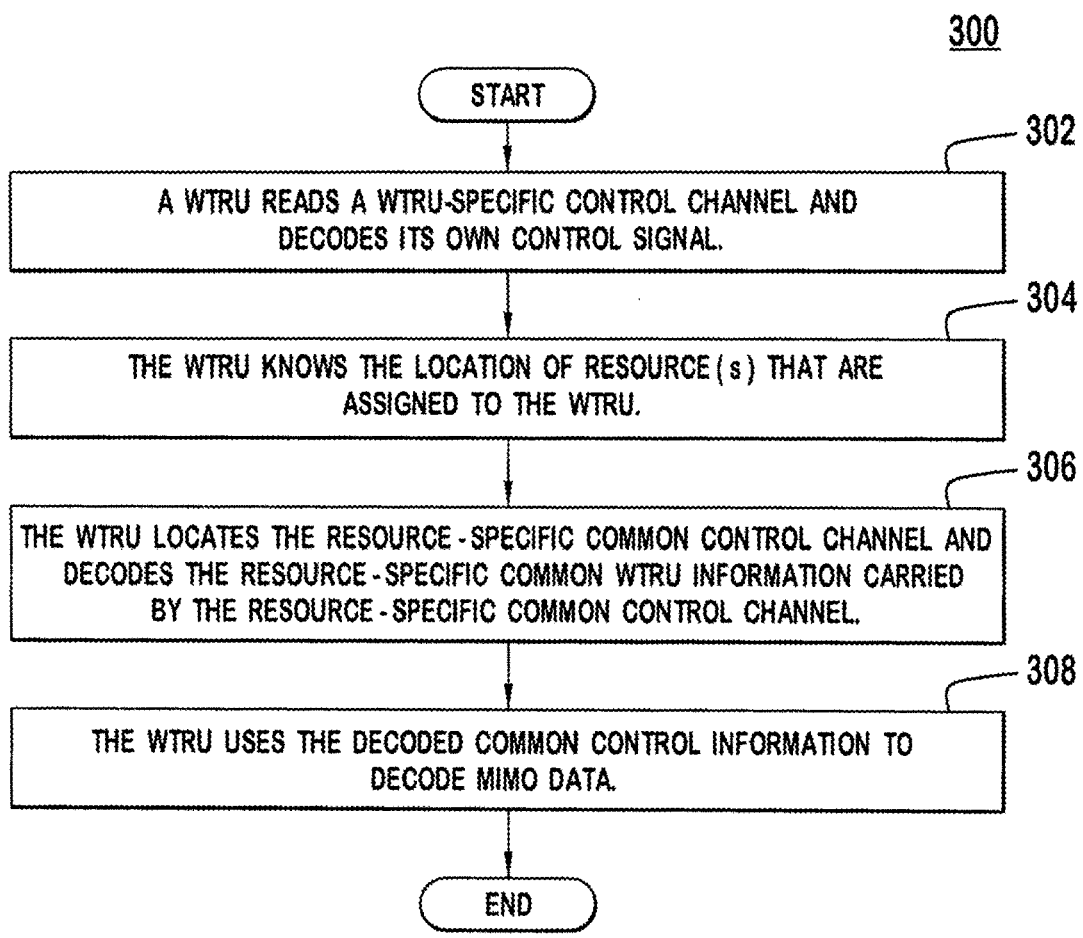
FIG. 3 is a flow diagram of a process for decoding control signaling.

FIG. 3 is a flow diagram of a process 300 for decoding the control signaling. A WTRU 110 reads a WTRU-specific control channel and decodes its own control signal (step 302). This may be done by blindly detecting and decoding a number of WTRU-specific control channels and identifying the control channel that is assigned to the WTRU. After successfully decoding the WTRU-specific control signal, the WTRU 110 knows the location of the resource(s) (RB(s), RBG(s), or sub-band(s)) that are assigned to the WTRU 110 (step 304). The WTRU 110 then locates the resource-specific (RB-specific, RBG-specific, or sub-band-specific) common control channel and decodes the resource-specific (RB-specific, RBG-specific or sub-band-specific) common control information carried by the resource-specific common control channel (step 306). The WTRU 110 uses the decoded control information, (the control information received via the WTRU-specific control signaling and the resource-specific common control information received via the resource-specific common control signaling), to decode MIMO data (step 308).

A downlink scheduling grant control signaling format is disclosed hereinafter. The downlink scheduling grant control signaling includes, one or combination of, the number of streams (or layers) (in case of SU-MIMO), the number of WTRUs (in case of MU-MIMO), a precoding matrix index (PMI) or a precoding vector index (PVI), a spatial channel identity (ID), a MIMO mode, or the like. The number of streams (or layers) indicates the number of streams (or layers) for the WTRU in an SU-MIMO mode. In an MU-MIMO mode, the number of WTRUs indicates the number of active WTRUs simultaneously assigned to the same resource (RB, RBG, or sub-band depending on how the resources are allocated and assigned).

The PMI or PVI indicates the PMI or PVI that is used by a Node-B. The spatial channel ID indicates the spatial channel ID of a particular WTRU in case of an MU-MIMO. The spatial channel ID indicates the column number of the precoding matrix that is indicated by the PMI, or the PVI that is assigned to the particular WTRU. The WTRU may use this information to identify and decode its own data after joint detection of all data. The MIMO mode indicates the MIMO mode used, such as closed-loop MIMO, open-loop MIMO (or transmit diversity), SU-MIMO, MU-MIMO, etc.

Table 1 shows an example of downlink scheduling grant control signaling format in accordance with this embodiment.

TABLE 1

| Control signaling information | Example number of bits | Notes |
|---|---|---|
| Downlink RB assignment information | NRB/2 | Bit mapping with paring of two neighboring RBs is assumed |
| WTRU ID | 16 | =CRC |
| Number of streams/layers/WTRUs | 2 | 1, 2, 3, or 4 streams/layers/WTRUs (If it is SU-MIMO, this parameter indicates number of layers or streams for the WTRU. If it is MU-MIMO, this parameter indicates number of active WTRUs per RB or RBG) |
| Precoding matrix/vector information (PMI/PVI) | [3] for 2 antennas; [3-6] for 4 antennas | This parameter indicates the PMI/PVI used by Node-B. |
| Spatial channel ID | [1] for 2 antennas; [2] for 4 antennas | This parameter indicates spatial channel ID of the own WTRU in MU-MIMO. |
| MIMO mode | [1-2] | Indicates MIMO mode, such as close-loop MIMO, open-loop MIMO (including TX diversity), SU-MIMO, MU-MIMO, etc. |
| Transport format information | 8 x Ncodeword | 2 bits for modulation, 6 bits for payload size per codeword control. Ncodeword is the number of codewords. |
| HARQ-related information | 5 x Ncodeword | 3 bits for process number (eight HARQ processing), 2 bits for redundancy version and new data indicator per codeword control. Ncodeword is the number of codewords. |

If the MIMO mode is semi-static or has a longer update rate, the MIMO mode parameter may be removed from the downlink control signaling and may be included in the another slow or semi-static downlink control signaling.

In accordance with another embodiment, the downlink scheduling grant control signaling includes, one or combination of, the number of streams (or layers) (in the case of SU-MIMO), the number of WTRUs (in the case of MU-MIMO), a spatial channel ID, a MIMO mode, or the like. The downlink scheduling grant control signaling in accordance with this embodiment is suited when a dedicated reference signal (RS) with a precoded pilot is used. The WTRU uses both a common pilot signal and a dedicated pilot signal to determine the transmit weights or precoding matrix or vector(s) that the Node-B uses. In this case PMI or PVI can be carried implicitly in dedicated reference channel. Resource-specific (RB-specific, RBG-specific or sub-band-specific) common control channel may be used to carry remaining control information that is common to all WTRUs assigned to the same resource, (i.e., RB, RBG, sub-band, or the like) for reducing control signaling overhead The number of streams (or layers) indicates the number of streams (or layers) for the WTRU if it is in an SU-MIMO mode. In the case of MU-MIMO, the number of WTRUs indicates the number of active WTRUs simultaneously assigned to the same resource (the same RB, RBG, sub-band, or the like depending on how the resources are allocated and assigned).

The spatial channel ID indicates the spatial channel ID for a particular WTRU if it is in an MU-MIMO mode. When a dedicated RS with a precoded pilot is used, the spatial channel ID indicates which dedicated RS is assigned for the WTRU, (i.e., spatial channel ID to dedicate RS mapping is preconfigured). The WTRU estimates the channel using the dedicated RS identified by the spatial channel ID and uses the channel estimate to identify and decode the data of its own after joint detection of data, (e.g., using joint minimum mean square error (MMSE) detection).

If an RB-specific, RBG-specific or sub-band-specific common control channel is used, the spatial channel ID may also indicate which segment or part of RB-specific, RBG-specific or sub-band-specific common control channel is assigned for the particular WTRU and/or which column vector in precoding matrix used by the Node-B is assigned for the WTRU. For example, for four WTRUs and four segments for RB-specific, RBG-specific or sub-band-specific common control channel, 2 bits may be used to identify the segment which carries a particular WTRU's information. The WTRU may use this information to decode its own data after joint detection of data.

The MIMO mode indicates the MIMO mode used by the Node-B, such as close-loop MIMO, open-loop MIMO (or transmit diversity), SU-MIMO, MU-MIMO, etc.

Table 2 shows an example of downlink scheduling grant control signaling. The signaling format in Table 2 also supports MU-MIMO in which one or multiple PMIs or PVIs of WTRUs are either sent via RB-specific, RBG-specific or sub-band-specific common control channel, or are embedded and carried in a dedicated reference signal (RS) using a precoded or beamformed pilot. A dedicated RS or WTRU-specific RS is another way to communicate the information of antenna weights, precoding matrices, beamforming vectors to WTRUs without explicit signaling via control channel.

TABLE 2

| Control signaling information | Example number of bits | Notes |
|---|---|---|
| Downlink RB assignment information | NRB/2 | Bit mapping with paring of two neighboring RBs is assumed |
| WTRU ID | 16 | =CRC |

TABLE 2-continued

| Control signaling information | Example number of bits | Notes |
|---|---|---|
| Number of streams/layers/WTRUs | 2 | 1, 2, 3, or 4 streams/layers/WTRUs (If it is SU-MIMO, this parameter indicates number of layers for the WTRU. If it is MU-MIMO, this parameter indicates number of active WTRUs per RB) |
| Spatial channel ID | [1] for 2 antennas; [2] for 4 antennas | This parameter indicates the spatial channel ID of the own WTRU in MU-MIMO. |
| MIMO mode | [1-2] | Indicates MIMO mode, such as closed-loop MIMO, open-loop MIMO (including tx diversity), SU-MIMO, MU-MIMO, etc. |
| Transport format information | 8 x Ncodeword | 2 bits for modulation, 6 bits for payload size per codeword control. Ncodeword is the number of codewords. |
| HARQ-related information | 5 x Ncodeword | 3 bits for process number (eight HARQ processing), 2 bits for redundancy version and new data indicator per codeword control. Ncodeword is the number of codewords. |

If the MIMO mode is semi-static or has a longer update rate than downlink scheduling grant, the MIMO mode parameter may be removed from the downlink scheduling grant control signaling and may be included in another slow or semi-static downlink control signaling.

It should be noted that the number of bits in Tables 1 and 2 are provided as example, and any other numbers may be employed considering the trade-offs between link and system performance and signaling overhead.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for processing multi-user multiple-input multiple-output (MU-MIMO) transmission associated with one wireless transmit/receive unit (WTRU) of a plurality of WTRUs that are assignable to a same resource, the method comprising:
    receiving, by the one wireless transmit/receive unit, downlink control information, the downlink control information indicating WTRU-specific MIMO information specific to the one WTRU, transport format information specific to the one WTRU and common MIMO information for the plurality of WTRUs assignable to the same resource; and
    receiving and processing, by the one WTRU, MIMO data based on the downlink control information.

2. The method of claim 1 further comprising performing, by the one WTRU, joint detection using MIMO information of other WTRUs.

3. The method of claim 1 further comprising transmitting the downlink control information via individual control signaling assigned for the one WTRU.

4. The method of claim 1 further comprising transmitting the common MIMO information via resource-specific common control signaling.

5. The method of claim 1 wherein the MIMO information is one of a precoding matrix index (PMI) or a precoding vector index (PVI).

6. The method of claim 1 wherein the downlink control information further includes transport format information for all other WTRUs assigned to the same resource.

7. The method of claim 6 further comprising performing, by the WTRU interference cancellation using transport format information of other WTRUs.

8. The method of claim 6 further comprising transmitting transport format information of all WTRUs via resource-specific common control signaling.

9. A wireless transmit/receive unit (WTRU) for processing multi-user multiple-input multiple-output (MU-MIMO)

transmission associated with a plurality of WTRUs including the WTRU that are assignable to a same resource, the WTRU comprising:
- a receiver for receiving downlink control information and MIMO data, the downlink control information indicating WTRU-specific MIMO information specific to the WTRU, transport format information specific to the WTRU and common MIMO information for the plurality of WTRUs assignable to the same resource; and
- a MIMO decoder for processing, by the WTRU, the MIMO data based on the downlink control information.

10. The WTRU of claim 9 wherein the MIMO decoder is configured to perform joint detection using MIMO information of other WTRUs.

11. The WTRU of claim 9 wherein the receiver is configured to receive the downlink control information via WTRU-specific control signaling.

12. The WTRU of claim 9 wherein the receiver is configured to receive the common MIMO information via resource-specific common control signaling.

13. The WTRU of claim 9 wherein the MIMO information is one of a precoding matrix index (PMI) or a precoding vector index (PVI).

14. The WTRU of claim 9 wherein the downlink control information further includes transport format information for all other WTRUs assigned to the same resource.

15. The WTRU of claim 14 wherein the MIMO decoder is configured to perform interference cancellation using transport format information of other WTRUs.

16. The WTRU of claim 14 wherein the receiver is configured to receive transport format information of all WTRUs via resource-specific common control signaling.

17. A method for supporting multi-user multiple-input multiple-output (MU-MIMO) transmission, the method comprising:
- assigning a resource to wireless transmit/receive units (WTRUs);
- transmitting downlink control information, the downlink control information including WTRU-specific MIMO information and transport format information for each of the WTRUs and common MIMO information for all WTRUs assigned to the same resource; and
- transmitting MIMO data.

18. The method of claim 17 wherein the downlink control information is transmitted via individual control signaling assigned to each of the WTRUs.

19. The method of claim 17 wherein the common MIMO information is transmitted via resource-specific common control signaling.

20. The method of claim 17 wherein the MIMO information is one of a precoding matrix index (PMI) or a precoding vector index (PVI).

21. The method of claim 17 wherein the downlink control information further includes transport format information for all other WTRUs assigned to the same resource.

22. The method of claim 21 wherein transport format information of all WTRUs is transmitted via resource-specific common control signaling.

23. A Node-B for supporting multi-user multiple-input multiple-output (MU-MIMO) transmission, the Node-B comprising:
- a controller for generating downlink control information, the downlink control information including wireless transmit/receive unit (WTRU)-specific MIMO information and transport format information for each of WTRUs and common MIMO information for all WTRUs assigned to the same resource; and
- a transmitter for transmitting the downlink control information and MIMO data.

24. The Node-B of claim 23 wherein the transmitter is configured to transmit the downlink control information via WTRU-specific control signaling.

25. The Node-B of claim 23 wherein the transmitter is configured to transmit common MIMO information via resource-specific common control signaling.

26. The Node-B of claim 23 wherein the MIMO information is one of a precoding matrix index (PMI) or a precoding vector index (PVI).

27. The Node-B of claim 23 wherein the downlink control information further includes transport format information for all other WTRUs assigned to the same resource.

28. The Node-B of claim 27 wherein the transmitter is configured to transmit all transport format information of the WTRUs via resource-specific common control signaling.

29. A method for processing multi-user multiple-input multiple-output (MU-MIMO) transmission associated with one wireless transmit/receive unit (WTRU) of a plurality of WTRUs that are assignable to a same resource, the method comprising:
- receiving, via the one WTRU, downlink control information, the downlink control information including first MIMO information specific to the one WTRU and first transport format information specific to the one WTRU, and indicating second MIMO information for processing MIMO data specific to the one WTRU from the same resource, exclusive of MIMO data of any other WTRU assignable to the same resource; and
- receiving and processing the MIMO data specific to the one WTRU based on the downlink control information.

30. The method of claim 29 wherein the downlink control information further includes a MIMO mode.

31. The method of claim 29 wherein the downlink control information provides a precoding vector index (PVI) and a spatial channel identity.

32. The method of claim 31 further comprising transmitting the PVI via resource-specific common control signaling.

33. The method of claim 29 further comprising:
- generating, by the one WTRU, a channel estimate using a dedicated reference signal assigned for the one WTRU; and
- decoding, by the one WTRU, the MIMO data using the generated channel estimate.

34. The WTRU of claim 33 further comprising identifying the dedicated reference signal by the spatial channel identity.

35. A wireless transmit/receive unit (WTRU) for processing multiple-input multiple-output (MIMO) transmission, the WTRU comprising:
- a receiver configured to receive downlink control information, the downlink control information including first MIMO information specific to the WTRU and first transport format information specific to the WTRU, and indicating second MIMO information for processing MIMO data specific to the WTRU from the same resource, exclusive of MIMO data of any other WTRU assignable to the same resource; and
- a MIMO decoder configured to process the MIMO data specific to the WTRU based on the downlink control information.

36. The WTRU of claim 35 wherein the downlink control information further includes a MIMO mode.

37. The WTRU of claim 35 wherein the downlink control information provides a precoding vector index (PVI) and a spatial channel identity.

38. The WTRU of claim 37 wherein the PVI is transmitted via resource-specific common control signaling.

39. The WTRU of claim 35 further comprising a channel estimator for generating a channel estimate using a dedicated reference signal assigned for the WTRU, and the MIMO decoder is configured to use the channel estimate in decoding the MIMO data.

40. The WTRU of claim 39 wherein the dedicated reference signal is identified by the spatial channel identity.

* * * * *